Patented Apr. 16, 1946

2,398,480

UNITED STATES PATENT OFFICE 2,398,480

PRODUCTION OF HALOGENATED MERCAPTANS AND THIO-ETHERS

William E. Vaughan and Frederick F. Rust, Berkeley, Calif., assignors to Shell Development Company, San Francisco, Calif., a corporation of Delaware No Drawing. Application March 29, 1941, Serial No. 385,968

10 Claims. (Cl. 204—158)

This invention relates to a process for the preparation of organic sulfur-containing compounds, and more particularly to the preparation of halogenated mercaptans and/or thio-ethers by reacting hydrogen sulfide with symmetrical or unsymmetrical halogenated organic compounds containing unsaturated linkages of aliphatic character. In one of its more specific embodiments, this invention pertains to a novel method of effecting a controlled reaction between hydrogen sulfide and unsymmetrical halogen-containing organic compounds containing at least one unsaturated linkage of aliphatic character, i. e. a double or triple bond, to produce valuable addition products of a predetermined character.

It is known that many, if not all, of the halogenated mercaptans and thio-ethers have valuable insecticidal, germicidal, fungicidal, vesicatory, sternutatory and/or lachrymal properties. For example, beta-chlor-ethyl mercaptan has excellent insecticidal properties and is quite toxic to higher animals. Similarly, gamma-chlorpropyl mercaptan possesses good lachrymal properties as well as satisfactory insecticidal and germicidal characteristics. Also, some of the halogenated thio-ethers are known vesicants. For instance, beta-beta'-dichlor-diethyl thio-ether, commonly known as "mustard gas," was the most important vesicant developed during World War I (see: Whitmore, "Organic Chemistry," p. 161).

The manufacture of these and similar halogenated mercaptans and/or thio-ethers, however, is quite difficult and cumbersome, usually necessitating the use of a plurality of steps and/or the cumbersome fractionation of the reaction mixtures to separate the desired product therefrom. Also, most of these previously known processes must be effected at elevated temperatures and superatmospheric pressures. Finally, even when such methods are employed, it is frequently difficult, if not totally impossible, to produce compounds having the halogen atom and the sulfhydryl group attached to certain desired carbon atoms of the organic compound. For instance, one of the known methods of producing mustard gas requires the treatment of ethylene monochlorhydrin with sodium sulfide, followed by a reaction between the resulting thioglycol and hydrogen chloride to produce the beta-beta'-dichlor-diethyl thio-ether. Another method comprises a high temperature reaction between ethylene and sulfur chloride, the resulting product containing free sulfur which is in a colloidal state so that its removal is quite difficult. Similarly, in order to prepare ethylene thio-chlorhydrin, it was necessary to proceed via the steps of first manufacturing ethylene chlorhydrin, followed by the conversion thereof to ethylene thioglycol, and the subsequent treatment of the latter with hydrogen chloride. In the alternative, the ethylene monothioglycol could be produced by reacting ethylene oxide with hydrogen sulfide, preferably by passing the reactants over certain clays at temperatures of 150° C. and above.

It is also known that mercaptans and thio-ethers may be produced by subjecting mixtures of hydrogen sulfide and unsaturated hydrocarbons to elevated temperatures in the neighborhood of from 200° C. to 700° C. In some instances, such reactions were effected at superatmospheric pressures. When the reactions are effected at such temperatures and pressures, the sulfhydryl group attaches to the unsaturated carbon atom containing the lesser number of hydrogen atoms attached thereto. In other words, the addition takes place according to Markownikoff's rule (see: Jones and Reid, "Journ. Amer. Chem. Soc.," vol. 60, pp. 2452–2455). Therefore, when terminally unsaturated olefins are thus reacted with hydrogen sulfide, the reaction product predominates in secondary mercaptans and/or secondary thio-ethers.

It has now been discovered that unsaturated halogenated organic compounds of the class more fully described hereinbelow may be reacted with hydrogen sulfide to effect a rapid, efficient and directional conversion of these unsaturated halogenated organic compounds to the corresponding halogenated mercaptans and/or thio-ethers. This conversion occurs via the so-called "abnormal" addition, i. e. contrary to the course suggested by the Markownikoff rule. According to the process of the present invention, this abnormal addition of hydrogen sulfide to halogenated unsaturated organic compounds may be effected in the absence of any compound or substance, such as free oxygen, air, ozone, peroxides, or the like, the presence of which was heretofore deemed necessary for promoting, sensitizing or catalyzing the abnormal addition of hydrogen sulfide to unsaturated hydrocarbons. Furthermore, according to the process of the present invention, the conversion of the halogenated unsaturated organic compounds, e. g. halogenated olefins, to the corresponding halogenated mercaptans and/or thio-ethers may be effected without the necessity of resorting to high temperatures and elevated pressures.

Broadly stated, the present invention resides in a photo-chemical process of effecting the addition of hydrogen sulfide to halogenated unsaturated organic compounds under the deliberate influence of ultra-violet radiation, this reaction being effected at normal temperatures, i. e. in the neighborhood of about 25° C. to about 15° C., or even at considerably lower temperatures. More particularly stated, the reaction is effected under the influence of light rays having a wave-length of below about 2900 to 3000 A. U. (Angstrom units). It has been still further discovered that these light rays strongly catalyze the photo-chemical addition of hydrogen sulfide to halogenated unsaturated organic compounds, this addition being preponderantly, if not wholly, contrary to the course suggested by Markownikoff for the addition of hydrogen halides, and in accordance with the rule proposed by Posner (Berichte, 38, 646 (1904)) concerning the addition of mercaptans to double bonds, this rule stating that the sulfur of the mercapto group normally becomes attached to the carbon atom holding the most hydrogen atoms. Therefore, the photo-chemical reaction taking place under the deliberate influence of ultra-violet radiations offers a direct method for obtaining primary mercaptans and/or primary thio-ethers from halogenated hydrocarbons containing a terminally unsaturated carbon atom, particularly when such terminal carbon atom carries a greater number of hydrogen atoms than the adjoining unsaturated carbon atom.

The halogenated unsaturated organic compounds which may be reacted with hydrogen sulfide according to the process of this invention include halogenated hydrocarbons containing one or more olefinic and/or acetylenic linkages. These compounds may contain one or more halogen (i. e. chlorine, bromine, iodine and/or fluorine) atoms which may be attached to the saturated and/or the unsaturated carbon atoms of the compound. Examples of such halogenated hydrocarbons are: vinyl halides, allyl halides, 2-halo-propylene, crotyl halides, isocrotyl halides, 4-halo-butene-1, methallyl halides, 2-halo-butene-2, monohalogenated acetylenes, propargyl halides, 1,1-dihalo-ethylene, trihaloethylene, 3-halo-pentene-1, 3-halo-cyclohexene, 2-halo-1,4-diphenyl butene-2, 3-halo-pentadiene-1,4, etc., and their homologues and analogues. The above compounds, and their various homologues, may be further substituted in the nucleus and/or in the substituents in various degrees by straight-chain, branched-chain, carbocyclic and/or heterocyclic radicals, and by such substituents as alkoxy, alkenoxy, alkyloxy, aralkoxy, alkylimido, and the like. Also, the organic compounds of the above class may contain two or more halogen atoms which may be attached to saturated and/or unsaturated carbon atoms.

The invention is particularly applicable to the reaction of hydrogen sulfide with halogenated unsaturated hydrocarbons having a terminal aliphatic unsaturated linkage, and especially with those halogenated hydrocarbons wherein the terminal unsaturated carbon atom carries a greater number of hydrogen atoms than the adjoining (vicinal) unsaturated carbon atom. When such unsaturates are reacted with hydrogen sulfide according to the process of the present invention, i. e. photo-chemically and under the influence of ultra-violet radiations, the reaction product predominates in or consists of halogenated primary mercaptans and/or halogenated primary thio-ethers.

Another group of unsaturated halogenated organic compounds which may be employed as one of the primary materials comprises or includes halogenated aliphatic hydrocarbons (and their substitution products) containing a plurality of olefinic and/or acetylenic linkages, particularly in the alpha-omega positions (i. e. compounds which are unsaturated in both terminal positions), provided the terminal unsaturated carbon atoms have a greater number of hydrogen atoms attached to the vicinal unsaturated carbon atom. Because the addition of hydrogen sulfide to halogenated unsaturated organic compounds, when effected photo-chemically and under the influence of ultra-violet radiations, is via the so-called abnormal addition discussed above, the sulfhydryl radicals will attach to the terminal carbon atoms which carry the greatest number of hydrogen atoms. When such halogenated unsaturated compounds containing double and/or triple bonds both in alpha and omega positions are thus treated, the reaction product contains primary di-mercaptans. If the molal ratio between the halogenated organic compound unsaturated in both terminal positions and the hydrogen sulfide is greater than 1:2, the primary di-mercaptans formed by the addition of two molecules of hydrogen sulfide to each molecule of the unsaturated compound, will in turn react with additional molecules of the unsaturated compound to produce primary thio-ethers possessing a high molecular weight. For example, hydrogen sulfide may be readily reacted with 2-chlor-butadiene-1,3 to produce chlorinated di-mercaptans, chlorinated mercapto thio-ethers and chlorinated polythio-ethers having the general formula

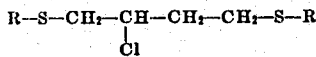

wherein each R represents a constituent which may be a hydrogen atom, a chlorinated butenyl radical, or a mercapto or thio-ether derivative of chloroprene. Instead of employing aliphatic straight chain poly-unsaturated halogenated hydrocarbons, it is also possible to use halogenated branched chain hydrocarbons, as well as halogenated compounds containing one or more alicyclic, aryl, aralkyl, and similar radicals, provided such compounds contain at least one unsaturated linkage of aliphatic character. In order to produce the above described high molecular weight compounds, the halogenated unsaturated compounds to be treated in accordance with the process of this invention should have at least two such unsaturated linkages of aliphatic character. As stated, it is preferable to use compounds wherein these unsaturated bonds are in alpha-omega (i. e. terminal) positions. However, halogenated organic compounds which contain more than one such unsaturated linkage in other than terminal positions may also be used. The reaction of these compounds with the hydrogen sulfide will produce branched-chain compounds having high molecular weights.

The reaction of hydrogen sulfide with the above-defined class of halogenated unsaturated organic compounds under the influence of ultra-violet radiations may be effected in the vapor or liquid phase, or in a two-phase liquid-vapor system. Since the abnormal addition of the hydrogen sulfide according to the present process occurs photo-chemically, no heating is necessary. In fact, although the reaction may be realized at atmospheric temperatures (i. e. between about 15° C. and about 25° C.), it may frequently be effected at temperatures as low as 0° C. and even considerably below this temperature, e. g. —75°

C. and below. Although the photo-chemical reaction may be effected at any pressure, it is preferred to employ superatmospheric pressures which are at least sufficient to maintain the reactants in a liquid phase. This is because the conversion rate appears to be accelerated when the reaction is effected in the liquid state.

Although the reaction described herein may be promoted by using the whole range of ultra-violet radiation, the most effective wave-lengths of light which promote the desired "abnormal" addition of hydrogen sulfide appear to lie in that portion of the spectrum which is below about 3200 Angstrom units, and more particularly in the region of about 2900 to 3000 Angstrom units and below. In fact, the interposing of an ordinary window glass filter (which has a lower limit of transmission of about 3300 A. U.) or of a Pyrex glass filter having a lower transmission limit of about 2900 to 3000 A. U., in the path of light coming from a source emitting ultra-violet radiations, will cause a substantially complete inhibition of the reaction unless some sensitizer, such as the organic peroxides, is added. On the other hand, the use of quartz vessels for the reaction according to the present invention allows efficient addition of hydrogen sulfide due to the fact that quartz transmits ultra-violet rays considerably below 2900 Angstrom units.

The addition of hydrogen sulfide to halogenated unsaturated organic compounds occurs very rapidly when effected under the influence of ultra-violet rays, particularly when relatively low boiling halogenated unsaturated hydrocarbons are thus treated in the liquid phase and when low wave-length rays of about 2900 A. U. and below are employed. In some cases, however, there is an initial induction period during which no or substantially no reaction occurs. This is particularly true when vapor phase reactions are effected, especially in the presence of certain impurities which adversely affect the reaction rate. The length of the induction period, if any, varies depending on a number of conditions, such as the specific reactants employed, presence or absence of a liquid phase, the concentration of the reactants in the reaction zone, presence or absence of impurities and/or added surfaces in the reaction zone, etc. Also, other conditions being equal, a change in the intensity of the effective wave-lengths of the ultra-violet radiation will vary the rate of the "abnormal" addition of the hydrogen sulfide and the production of the halogenated mercaptans and/or thio-ethers.

The reaction may be effected in a batch, intermittent or continuous manner. When effected by a batch method, the reactants may be conveyed into a suitable container which is then illuminated with ultra-violet light for a period of time sufficient to effect the desired addition reaction. Since ordinary or Pyrex glass will not permit the substantial transmission of the effective light waves, namely those in the neighborhood of 2900 to 3000 Angstrom units and below, it is preferable to construct the container of quartz or other suitable light transmitting materials, e. g. calcium fluoride, or at least, to provide such container with an opening or window of quartz, calcium fluoride or the like, through which the interior may be illuminated with ultra-violet rays. In case of a continuous process, the reactants, viz. hydrogen sulfide and the halogenated unsaturated organic compound, such as an aliphatic terminally unsaturated halogenated hydrocarbon, may be conveyed, either in a liquid or vapor state, or both, through the interior of a reaction chamber. This chamber may be of sufficient length so as to permit adequate residence time for the reactants. The reactants in the reaction chamber are then subjected to ultra-violet radiations emanating from a source or sources disposed within or without the chamber. In the former case, the reactor may be constructed of steel or the like, the source of the ultra-violet radiations being disposed in the path of the moving reactants. The discharged reaction products may then be treated by any known or suitable means and methods for the separation of the desired halogenated mercaptans and/or thio-ethers from the unreacted material, if such is still present in the reaction mixture.

The invention is illustrated by the following specific examples, it being understood that there is no intention of being limited by any specific details thereof, since many variations may be made.

*Example I*

About 9 cubic centimeters of liquefied hydrogen sulfide and approximately 10 cubic centimeters of liquefied vinyl chloride were introduced into a substantially air-free quartz reactor which was maintained cold by means of liquid air. The reactor was then sealed and the contents subjected to illumination from a quartz mercury arc lamp for a period of about 10 minutes. The reactants, during this illumination, were maintained at a temperature of between about 15° C. and about 25° C. A relatively violent ebullition of the reactants occurred as soon as illumination was started, this boiling continuing during the whole reaction period. Thereafter, the reactor was opened and the unreacted hydrogen sulfide and vinyl chloride were allowed to evaporate. The reaction product, the yield of which was equal to about 70% to 80% as calculated on the vinyl chloride, consisted of a mixture of ethylene thiochlorhydrin and beta-beta'-dichlor-diethyl thio-ether (i. e. mustard gas).

*Example II*

Five cubic centimeters each of liquid hydrogen sulfide and of liquid vinyl chloride were sealed in an evacuated quartz tube, and were then subjected at a temperature of about 0° C. and for a period of about ten minutes to ultra-violet radiations emanating from a quartz mercury arc lamp. This resulted in the formation of about seven (7) cubic centimeters of a reaction product consisting of a mixture of ethylene thiochlorhydrin and beta-beta'-dichlor-diethyl thio-ether.

*Example III*

In order to show the effect of light rays having wave-lengths of about 2900–3000 A. U., and below, on the addition reaction, the experiment described in Example II was repeated with the only difference that the reactants were sealed in a Pyrex glass reactor, which as is known does not transmit wave-lengths lower than about 2900 to 3000 A. U. A ten-minute illumination of the reactants by rays emanating from a quartz mercury lamp produced only a trace of a reaction product, the vinyl chloride and hydrogen sulfide remaining substanitally unaffected by this treatment in a Pyrex glass tube.

The effect of ultra-violet radiations on the reaction was also demonstrated by the fact that illumination of reactants in a quartz tube caused substantially immediate boiling thereof, while upon the removal of the source of these rays the liquid reactants became quiescent.

Example IV

A liquid, equi-molecular mixture of hydrogen sulfide and vinyl chloride, contained in an evacuated sealed quartz tube, was illuminated for about ten minutes with the full radiation of a 400 watt quartz-mercury arc lamp placed about 25 cm. from the tube. The reactants, which were employed in a quantity of about 7.5 cubic centimeters each, were maintained at a temperature of about −78° C. by means of a mixture of solid carbon dioxide and alcohol disposed in a quartz envelope surrounding the reactor. After evaporation of the unreacted vinyl chloride and hydrogen sulfide, there remained approximately four cubic centimeters of a reaction product which, upon analysis, showed that it consisted of approximately equal parts of ethylene thiochlorhydrin and beta-beta'-dichlor-diethyl thio-ether.

Example V

Approximately 4.5 cubic centimeters of degassed 2-chlor-butene-2 and about 2.7 cubic centimeters of hydrogen sulfide were introduced into an evacuated quartz tube which was then sealed and illuminated for about ten minutes by light rays from a quartz mercury arc lamp. The reactants were maintained at a temperature of −78° C. An analysis of the reaction product indicated that it contained 2-chloro-3-mercapto butane.

Although the above examples show the application of the present invention to the abnormal addition reactions between hydrogen sulfide and chlorinated olefins, it is to be understood that the process is also applicable to reactions in which other halogenated unsaturated organic compounds of the defined class are used as the primary material. Also, although these halogenated unsaturated compounds may contain one or more halogen atoms, whether these be chlorine, bromine, iodine and/or fluorine atoms, the process is of particular use for the treatment of chlorinated, brominated and/or fluorinated unsaturates. This is because in some instances the illumination of unsaturates containing iodine atoms effects the liberation of iodine which may act as a reaction inhibitor. Furthermore, by varying the mol ratio of the hydrogen sulfide to the halogenated compound it is possible to obtain a reaction product which predominates in either the halogenated mercaptan or the corresponding thio-ether.

We claim as our invention:

1. In a process of producing beta-beta'-dichlor-diethyl thio-ether, the steps of contacting hydrogen sulfide with vinyl chloride, maintaining a molal excess of vinyl chloride over the hydrogen sulfide, maintaining said reactants in a liquid state and at a temperature not in excess of 25° C., and subjecting the reactants to the influence of light rays having wave-lengths below 3000 Angstrom units.

2. In a process of producing addition compounds of the class consisting of ethylene thiochlorhydrin and beta-beta'-dichlor-diethyl thio-ether, the steps of reacting vinyl chloride with hydrogen sulfide, maintaining the reactants at a temperature not in excess of 25° C., and effecting the reaction under the influence of light rays having wave-lengths below 3000 Angstrom units.

3. In a process of producing 2-chlor-3-mercapto-butane, the step of reacting 2-chlor-butene-2 with hydrogen sulfide, at a temperature not in excess of 25° C. and under the influence of light rays having wave-lengths below 3000 Angstrom units.

4. In a process of producing addition compounds of the class consisting of chlorinated mercaptans and chlorinated thio-ethers, the steps of reacting hydrogen sulfide with a mono-chlorinated alpha-unsaturated aliphatic hydrocarbon, maintaining the reactants in a liquid state and at a temperature not in excess of 25° C., and effecting the reaction under the influence of ultra-violet radiations having wave-lengths below 3000 Angstrom units.

5. In a process of producing addition compounds of the class consisting of halogenated mercaptans and halogenated thio-ethers, the steps of reacting hydrogen sulfide with an alpha-unsaturated aliphatic hydrocarbon containing at least one halogen atom, maintaining the reactants in a liquid state and at a temperture not in excess of 25° C., and effecting the reaction under the influence of ultra-violet radiations having wave-lengths below 3000 Angstrom units.

6. In a process of producing addition compounds of the class consisting of halogenated mercaptans and halogenated thio-ethers, the steps of contacting hydrogen sulfide with a halogenated organic compound containing terminally unsaturated linkages of aliphatic character, maintaining the reactants in a liquid state and at a temperature not in excess of about 25° C., and subjecting the reactants to light rays having wave-lengths of below 3000 Angstrom units.

7. The process according to claim 6, wherein the reaction is effected at a temperature between about 0° C. and about 25° C.

8. In a process of producing addition compounds of the class consisting of halogenated mercaptans and halogenated thio-ethers, the steps of mixing hydrogen sulfide with a halogenated organic compound containing an unsaturated linkage of aliphatic character in alpha-position, maintaining the reactants in a liquid state and at a temperature not in excess of about 25° C., and subjecting the reactants to light rays having wave-lengths of below 3000 Angstrom units.

9. In a process for the production of addition compounds of the class consisting of halogenated mercaptans and halogenated thio-ethers, the steps of contacting a halogenated organic compound containing at least one unsaturated linkage between two carbon atoms of aliphatic character with hydrogen sulfide, maintaining the reactants at a temperature not in excess of about 25° C., and subjecting the reactants to the influence of ultra-violet rays having wave-lengths of below 3000 Angstrom units.

10. In a process of effecting a photo-chemical reaction between hydrogen sulfide and halogenated unsaturated organic compounds to produce addition compounds of the class consisting of halogenated mercaptans and halogenated thio-ethers, the steps of reacting an unsymmetrical halogenated unsaturated organic compound containing an unsaturated linkage between two carbon atoms of aliphatic character with hydrogen sulfide, maintaining the reactants at a temperature not in excess of about 25° C., and effecting the reaction under the influence of ultra-violet radiations having wave-lengths below 3000 Angstrom units.

WILLIAM E. VAUGHAN.
FREDERICK F. RUST.